United States Patent
Pinho et al.

(10) Patent No.: US 7,087,154 B2
(45) Date of Patent: Aug. 8, 2006

(54) APPARATUS AND PROCESS FOR DOWNFLOW FLUID CATALYTIC CRACKING

(75) Inventors: Andréa de Rezende Pinho, Rio de Janeiro (BR); José Geraldo Furtado Ramos, Rio de Janeiro (BR); Wilson Kenzo Huziwara, Rio de Janeiro (BR); Cláudio Fonseca Machado dos Santos, Rio de Janeiro (BR); Mauro Silva, Rio de Janeiro (BR); Aurélio Medina Dubois, Rio de Janeiro (BR); Nelson Patricio Junior, Rio de Janeiro (BR); Jorivaldo Medeiros, Rio de Janeiro (BR); Paulo Sérgio Freire, Rio de Janeiro (BR); Walcondiney Pereira Nunes, Rio de Janeiro (BR); Paulo Sérgio Moreira Assumpção, Rio de Janeiro (BR)

(73) Assignee: Petroleo Brasileiro S.A. - Petrobras, Rio de Janeiro (BR)

( * ) Notice: Subject to any disclaimer, the term of this patent is extended or adjusted under 35 U.S.C. 154(b) by 661 days.

(21) Appl. No.: 10/330,967

(22) Filed: Dec. 30, 2002

(65) Prior Publication Data

US 2004/0124124 A1    Jul. 1, 2004

(51) Int. Cl.
*C10G 11/00* (2006.01)
*B01J 8/18* (2006.01)

(52) U.S. Cl. .................. 208/113; 422/139; 422/141; 422/144; 422/147

(58) Field of Classification Search .......... 422/139, 422/141, 144, 147; 208/113, 146, 147, 152, 208/161
See application file for complete search history.

(56) References Cited

U.S. PATENT DOCUMENTS

| | | | |
|---|---|---|---|
| 2,929,774 A * | 3/1960 | Smith | 208/113 |
| 2,959,534 A * | 11/1960 | Fogle | 208/59 |
| 4,514,285 A | 4/1985 | Niccum et al. | |
| 4,556,542 A * | 12/1985 | Sayles et al. | 422/147 |
| 4,797,262 A * | 1/1989 | Dewitz | 422/142 |
| 5,066,467 A * | 11/1991 | Chan | 422/140 |
| 5,160,513 A * | 11/1992 | Koves | 95/90 |
| 5,468,369 A | 11/1995 | Muldowney | |
| 5,498,326 A | 3/1996 | Galtier et al. | |
| 5,569,435 A | 10/1996 | Fusco et al. | |
| 5,582,712 A | 12/1996 | Zinke et al. | |
| 6,099,720 A * | 8/2000 | Pontier et al. | 208/113 |
| 6,113,776 A * | 9/2000 | Upson | 208/113 |
| 6,187,272 B1 * | 2/2001 | Ikeda | 422/141 |

FOREIGN PATENT DOCUMENTS

BR   PI BR-0101433   2/2003
WO   WO 01/44406 A1   6/2001

* cited by examiner

*Primary Examiner*—Walter D. Griffin
*Assistant Examiner*—John Douglas
(74) *Attorney, Agent, or Firm*—Sughrue Mion, PLLC (57) ABSTRACT

An apparatus for downflow fluid catalytic cracking is described, which comprises a regenerated catalyst riser carrying regenerated catalyst and a carrying fluid, those being directed through a crossover section to a distributor that will centrifuge gas and separate catalyst from carrying fluid, the catalyst being directed to a downflow reactor through a distributing basket provided with perforations. The upper part of the reactor is provided with feed injectors, which atomize the feed so that feed vaporization and feed and catalyst admixture is optimized. After the cracking reaction in downflow reactor, reaction products are separated and spent catalyst is directed to stripping and regeneration sections. The FCC process carried out in the apparatus is also described.

55 Claims, 5 Drawing Sheets

APPARATUS AND PROCESS FOR DOWNFLOW FLUID CATALYTIC CRACKING

FIELD OF THE INVENTION

The present invention relates to an apparatus and to a process for downflow fluid catalytic cracking, the apparatus comprising a regenerated catalyst riser, a distributor for said regenerated catalyst, a downflow reactor, and a quick separation device inside a collector vessel. More specifically, the invention relates to an apparatus and to a process for downflow catalytic cracking of heavy feeds with maximization of catalytic cracking and valuable products which makes use of a regenerated catalyst distributor the design of which allows a more evenly distribution of the catalyst to be contacted with the feed in the downflow reactor reaction zone. Besides the said distributor, the apparatus as a whole incorporates other favorable features, which add to the performance of the whole system and ultimately to the downflow FCC process.

BACKGROUND INFORMATION

FCC processes are well known. In the more usual FCC processes employing riser reactors the catalyst and the hydrocarbon feed flow upward, while in FCC processes employing downflow reactors the catalyst and the hydrocarbon feed flow downward.

In riser reactors, solids flow upward due to the lift caused by the ascending vaporized feed. However, the velocity of the hydrocarbon vapor is lower near the wall than it is near the center of the reactor. Therefore, the catalyst will move more slowly near the reactor wall than near the center, resulting in a slower moving area with a high catalyst density near the wall and a low-resistance path of ascending hydrocarbon vapor near the center. Hence, the hydrocarbon vapor mainly flows through the center, whereas the catalyst is mainly located near the walls. The resulting flow pattern is called core-annulus.

Furthermore, the upward flow of solid catalyst and hydrocarbon vapor in riser reactors oppose gravity, resulting in a catalyst flow that is significantly slower than the much lighter hydrocarbon flow. The ratio of feed velocity to catalyst velocity, i.e., the slip factor, generally is about 2–3. This results in backmixing of the catalyst, leading to longer residence times of the catalyst and the occurrence of undesirable secondary reactions such as overcracking.

In contrast to riser reactors, downflow reactors do not display large differences in velocity and catalyst density between the center and the wall of the reactor. Furthermore, as the catalyst particles do not oppose gravity, the difference in velocity between the catalyst flow and the hydrocarbon flow in these reactors is smaller than in riser reactors. The slip factor of downflow reactors generally is about 1.

Consequently, backmixing is largely avoided, the catalyst is more evenly distributed across the entire reactor, and the effective contact time of the catalyst and the feed in a downflow reactor is less than in a riser reactor.

U.S. Pat. No. 5,498,326 teaches a process for catalytic cracking and the associated apparatus in which the cracking reaction takes place in two substantially vertical and successive reaction zones, the feed being introduced into the first zone where it circulates from the top downwards, then at least a portion of the product obtained is introduced in a second reaction zone in which it circulates in an ascending fashion. It is alleged that in downward reactors the separation is made more difficult in virtue of the substantial concentration of catalyst in the reaction medium, which requires specifically designed equipment if suitable efficiency is to be enjoyed. That is why the separation is effected after the reaction in the ascending mode. However, this arrangement implies that the contact time between hydrocarbon vapor and catalyst is made excessively long, with the ensuing well-known drawbacks resulting from long contact time, that is, thermal cracking, coke, etc. Thus, the situation depicted in FIG. 2 of this patent shows that after the reaction in downflow reactor 27, in intermediate area 34 the reaction between hydrocarbon vapor and catalyst continues for a certain period of time before the separation of hydrocarbon vapor and catalyst designed to occur in riser 35. Therefore the advantages from the use of both downflow and riser reactors may be wasted and the efficacy of the technique to secure the alleged benefits are rather low.

U.S. Pat. No. 5,468,369 ('369 patent) teaches a process for short contact time fluidized catalytic cracking of heavy oil feed using a reactor with an upflow catalyst-to-oil vaporizer and a downflow reactor. Catalyst slip permits efficient mixing and limited conversion in the upflow section, while cracking is completed in the downflow reactor with minimal segregation of catalyst. The catalyst has a 25 wt % Y zeolite content and total vapor residence time is less than 5 seconds. The patent contains a thorough explanation on the kinds of short contact time reactors, that is, risers and downflow reactors. It is stated that by virtue of the nearly absence of slip in downflow reactors, no core-annular or similar flow forms, the phases retaining throughout the entire reactor exactly the state of admixture which they have upon leaving the mixing section at the top. The solids do not migrate, stall, scatter or clump. For this reason downflow reactors cannot induce suboptimal kinetics due to radial phase separation.

Also discussed in said US '369 patent is a shortcoming of the downflow reactor, that is, initial catalyst-to-oil mixing can be difficult to achieve because gravity acts to decrease the solids density in the zone of initial contacting, contrary to the effects noted in a riser. Entering solids tend to drop immediately downward and cannot reflux or circulate in any way, which might enhance initial heat and mass transfer with the oil. If the inlet flows of catalyst and oil were perfectly steady and perfectly balanced, this effect would be less important. However fluidized solids flow is never truly steady and usually features small-amplitude oscillations in solids density whether moving in a riser or a downflow reactor. Thus the gas-solids mixture in a cracking reactor actually consists of alternating catalyst-rich and catalyst-lean pulses, the variations being fairly small. In a riser the pulses have little impact because oil vapor, traveling faster than catalyst, passes through the regions of high and low solids density and experiences on balance the proper (average) catalyst-to-oil ratio. A downflow reactor, by contrast, has no mechanism for moving oil from catalyst-lean to catalyst-rich regions and vice versa. Oil, which enters in a region of low solid density will remain there through the entire reactor, ultimately subject to thermal cracking due to premature deactivation of the catalyst. Oil in a high-density region tends to be overcracked. Hence the products of low catalyst-to-oil and high catalyst-to-oil ratios do not in any way "average" to the products of the correct catalyst-to-oil ratio. As will be seen later in the present specification, the present invention overcomes this and other drawbacks of downflow reactors by using a novel regenerated catalyst distributor, which improves the efficiency of the catalyst-to-oil mixing, a proprietary feed injectors and a lean catalyst phase.

Further, it should be pointed out that the '369 patent fails to achieve the alleged goals since the upflow internal mixing section as illustrated in FIG. 2 of said patent suffers from the following drawbacks: i) the feed is injected in 115 according to the axial mode, which is an out-of-date mode, implying a poor feed distribution, ii) there is a high amount of catalyst in reactor 100, on the other hand, there is a gap between the moment the feed enters reactor 100 and it vaporizes, as a consequence, a great possibility of coking exists; iii) another point to be considered in reactor 100, is an excessive contact time between catalyst and feed, with the consequent increase in coke build-up on the catalyst.

Generally, it is considered that the two main design features in FCC processes are the catalyst-to-oil mixing at the feed injection point and the separation of hydrocarbon products from spent catalyst.

As regards the catalyst-to-oil mixing, important state-of-the-art documents are cited below.

As for the catalyst-to-oil mixing the present invention makes use of a proprietary device, object of Brazilian Patent Application PI BR 0101433-1 herein completely incorporated as reference, said device being a portion of the regenerated catalyst distributor of the invention, said device basically comprising, according to FIG. 1 of said Brazilian application, a conduit (1) the diameter of which is smaller than the diameter of the downflow reactor, a plate (3) provided with evenly distributed perforations and which makes up the bottom of a collector/distributor catalyst vessel (2) predominantly cylindrical, axially and longitudinally mounted inside conduit (1). As will be seen later in the present specification, said device is extremely useful in achieving an optimized catalyst distribution to the downflow reaction section immediately below.

However, the device taught in PI BR 0101433-1 does not allow processing a mixture of catalyst and gas. Catalyst only may be adequately distributed through the perforated plate, for instance, received from a slide valve mounted on top of the perforated plate. This restricts the use of such a device to a situation where there is catalyst flow only, preferably below a regenerated catalyst slide valve.

As opposed to the limitations of said device, the present application can be used to an admixture of catalyst and carrying fluid from a riser, then properly separating carrying fluid from catalyst and adequately distributing catalyst in a distributor to contact the feed so as to vaporize and crack same.

Another aspect of the catalyst-to-oil mixing is the feed vaporization. As regards this point, the present invention makes use in the present downflow reactor apparatus, of another proprietary device, fully incorporated herein as reference, which is a feed injector, published as WO 01/44406A1, such injector comprising two concentric conduits, where an atomization fluid flows through an inner conduit, while the liquid feed flows through the annular space formed by the outer surface of the inner conduit and the inner surface of the outer conduit; an atomization unit having nozzles arranged in rows, with one row having central nozzles connected to the inner conduit for atomization fluid, and two or more rows of side nozzles, connected to the outer feed conduit, the central nozzles and side nozzles of the atomization unit being geometrically placed so that energy of the atomization fluid is fully transferred by contact to the flow of feed, this resulting in the complete atomization of the feed; and a mixing chamber formed by the edges of the central nozzles, the dimensions of which are able to prevent the coalescence of the formed oil droplets.

Feed injector claimed in WO 01/444064A1 is a highly efficient injector. The combined use of such a feed injector or similarly efficient injectors with characteristics of the downflow technology herein disclosed overcomes the draw backs typical of downflow reactors due to the low slip factor which causes an effective short contact time of catalyst within the mixing zone. The quick feed vaporization secured by such efficient injectors allows the cracking reaction to proceed in those short contact times.

The second important feature in FCC processes, v.i.z., separation of products and spent catalyst after the cracking reaction, is considered in two patents: U.S. Pat. No. 4,514,285 and U.S. Pat. No. 5,582,712.

Quick separation of hydrocarbon products and catalyst is a mandatory consequence of the short contact reaction time achieved in a downflow reactor, since it is nearly meaningless to profit from the benefits of the downflow reactor while such benefits may be lost by a too long separation step.

U.S. Pat. No. 4,514,285 teaches a catalyst separation method for separation of spent catalyst from reaction products and for separation of regenerated catalyst from flue gases. The separation method is referred to in said patent as a ballistic system, that is, a system in which the momentum of the catalyst particles assisted by gravity is utilized to effect separation of catalyst from reaction products or flue gases without the need for complex equipment. The proposed equipment involves a ballistic separation zone having a cross-sectional area within the range of 20 to 30 times the cross-sectional area of the reaction zone and open at its lower end to a stripping zone therefore permitting unobstructed free fall of catalyst under the influence of gravity. The problem is that discharging catalyst into separation section 15 of vessel 16 having such a high ratio of cross sectional area implies in augmented possibilities of undesirable thermal cracking and coke build-up.

Also, the concept of U.S. Pat. No. 4,514,285 does not allow to processing a mixture of catalyst and gas. Catalyst only may be adequately distributed through the perforated plate, for instance, catalyst received from a slide valve mounted on the top of the perforated plate.

U.S. Pat. No. 5,582,712 is also directed to quick separation methods involving two-step separation of spent catalyst and hydrocarbon products resulting from a downflow FCC reactor. It should be pointed out that the use of enclosing cyclone separators taught by said US patent may be a problem whenever there is any unsteady operation of the reactor, which leads to a lower separator efficiency and therefore to undesirable overcracking reactions due to entrainment of the gas phase which reacted with the catalyst suspension, as well as heavy catalyst losses to the product fractioning system and auxiliary equipment thereof.

Also, U.S. Pat. No. 5,582,712 does not recognize the necessity of providing an external path for stripper gases. On the contrary, the stripper gas is withdrawn through a conduit together with the vapor products. Since the kind of conduit taught in said patent is the normal gas outlet of a cyclone, this arrangement will render inoperable a commercial FCC unit due to the reasons pointed out below.

FCC commercial unit cyclones operate at an efficiency of 99.995% plus. Such a high efficiency is of paramount importance to assure the operability of the unit. A typical FCC unit with a capacity of 37,000 BPD circulates 30 ton per minute of catalyst as solid particles through the gas/solid separation device at the end of the transport zone. A device having an efficiency of 99.995% means a daily solids loss of the order of 2.2 tons to downstream equipment. If for any reason the efficiency of a cyclone is slightly reduced, for example, to 99.985%, catalyst loss may attain 6.5 tons. This amount may cause circulation problems due to equipment fouling, loss of heat exchange capacity, pump losses due to rapid erosion, besides an extremely high catalyst operational cost.

So, a device based on cyclone separation without considering an external passage for the stripper gas or for small amounts of gas escaping from the cyclone due to pressure surges would probably suffer from an efficiency loss even much higher than that of the cited example. Lab scale as well as industrial unit tests by the Applicant confirm this assertion.

On the other hand, U.S. Pat. No. 5,569,435 of the Applicant and fully incorporated herein as reference teaches a system for separating catalyst particles from reacted hydrocarbons which includes an unconfined cyclone device made up of a diplegless cyclone opening directly into a large volume separator vessel downwardly through a mouth and upwardly through an annular space between concentric pipes. The proposed system is applied to upward FCC reactors. In the present application said system may be applied to effect the quick separation of spent catalyst from reacted hydrocarbons in a downward reactor.

Therefore, the cited literature teaches methods and systems for improved catalyst-to-oil mixing as well as for spent catalyst/reacted hydrocarbons separation, for upward reactors as well as for downflow reactors for FCC processes. However, no document as such nor combined to other documents describes or suggests the inventive arrangement of a regenerated catalyst riser, a catalyst distributor provided with a perforated plate to allow optimized radial catalyst distribution, feed injectors to allow complete vaporization of the feed and a downflow reactor with a quick separation device inside a collector vessel provided with diplegless cyclones adapted for downflow reactor systems, such apparatus and FCC process being described and claimed in the present application.

SUMMARY OF THE INVENTION

Broadly, the apparatus for carrying a fluid catalytic cracking process in a downflow reactor according to the principles of the invention comprises:
a) A regenerated catalyst riser, through which is carried a diluted phase of regenerated catalyst up to a catalyst distributor;
b) A regenerated catalyst distributor provided with a perforated plate and an independent passage for the catalyst carrying fluid in the regenerated catalyst riser, said catalyst distributor being connected to the riser by a crossover section and to a downflow reactor by a catalyst acceleration zone followed by a mixing zone, said distributor separating catalyst from carrying fluid by centrifuging and redistributing both catalyst and carrying fluid streams to said downflow reactor;
c) A downflow reactor provided in its upper part with feed injectors to vaporize the feed and contact the descending catalyst, the bottom of the reactor being connected to a quick separation device inside a collector vessel;
d) A collector vessel that embodies a quick separation device to swiftly separating spent catalyst from reacted hydrocarbon gases.

And the process of the invention comprises directing a stream of regenerated catalyst from a regeneration zone admixed to a carrying fluid through a riser and into the catalyst distributor, where carrying fluid and catalyst are centrifuged and catalyst is evenly distributed and is directed downwards to meet the feed which has been atomized by the feed injectors, the feed being vaporized as heat is provided by said stream of regenerated catalyst, reacting then catalyst and feed in said downflow reactor then spent catalyst and reacted hydrocarbons are separated in a quick separation device inside a collector vessel.

Thus, the present invention provides an apparatus for FCC downflow reactions which combines a regenerated catalyst riser which lifts a diluted phase catalyst phase up to a catalyst distributor the design of which, combined to the features of the feed injectors, connected through a properly designed catalyst acceleration zone, allows an optimum catalyst-to-oil mixing.

The present invention provides still an apparatus for FCC downflow reactions which permits quick and easy separation of spent catalyst and reacted hydrocarbons, further improving overall process performance.

The present invention provides further a low-cost installation of the present apparatus in an existing FCC unit.

The invention provides still a process for the fluid catalytic cracking of high boiling point hydrocarbon oils under short contact time reaction conditions with high yields in valuable light hydrocarbons and gasoline fraction, while keeping coke within acceptable levels.

DETAILED DESCRIPTION OF THE INVENTION

The present invention is thus directed to an apparatus and to a process for the fluidized catalytic cracking of a hydrocarbon feed oil containing liquid hydrocarbons boiling between 340° C. to 720° C.

One aspect of the invention is an apparatus for catalytic cracking using a downflow reactor.

A second aspect of the invention is the FCC process carried out using the inventive apparatus.

The apparatus, generally designed by numeral 100 for fluid catalytic cracking using a downflow reactor comprises:
a) A regenerated catalyst riser 10 carrying a diluted phase regenerated catalyst up to a regenerated catalyst distributor 30;
b) A regenerated catalyst distributor 30, provided with a distributing basket 35 and an independent passage through at least two pipes 33 for the carrying fluid used to carry catalyst in regenerated catalyst riser 10, said catalyst distributor 30 being connected to riser 10 by a crossover section 20 and to a downflow reactor 50 by means of a catalyst acceleration zone 37 followed by a mixing zone 40, said distributor 30 centrifuging carrying fluid and catalyst and distributing catalyst to said downflow reactor 50;

c) A downflow reactor 50, having in the upper part of same a mixing zone 40 to start the catalytic cracking reaction, wherein said mixing zone 40 is provided with feed injectors 41 to vaporize the feed which will contact the regenerated catalyst in said mixing zone 40, the bottom part of reactor 50 being connected to diplegless cyclones 61 by means of rectangular cross-section pipe 67;

d) A collector vessel 60 provided with a quick separation device to swiftly separating spent catalyst from reacted hydrocarbon gases.

In collector vessel 60, the quick separation device is provided with diplegless cyclones 61 to effect the swift separation of cracked hydrocarbons from particulate phases, outlet pipe 66 to exit the stream of cracked hydrocarbons substantially free from catalyst particles and to the fractioning system, and a spent catalyst conduit 65.

The following detailed description of the constituting parts of the inventive apparatus will now be made based on the accompanying Figures, which should not be construed as limiting the scope of the invention.

Figure 1:
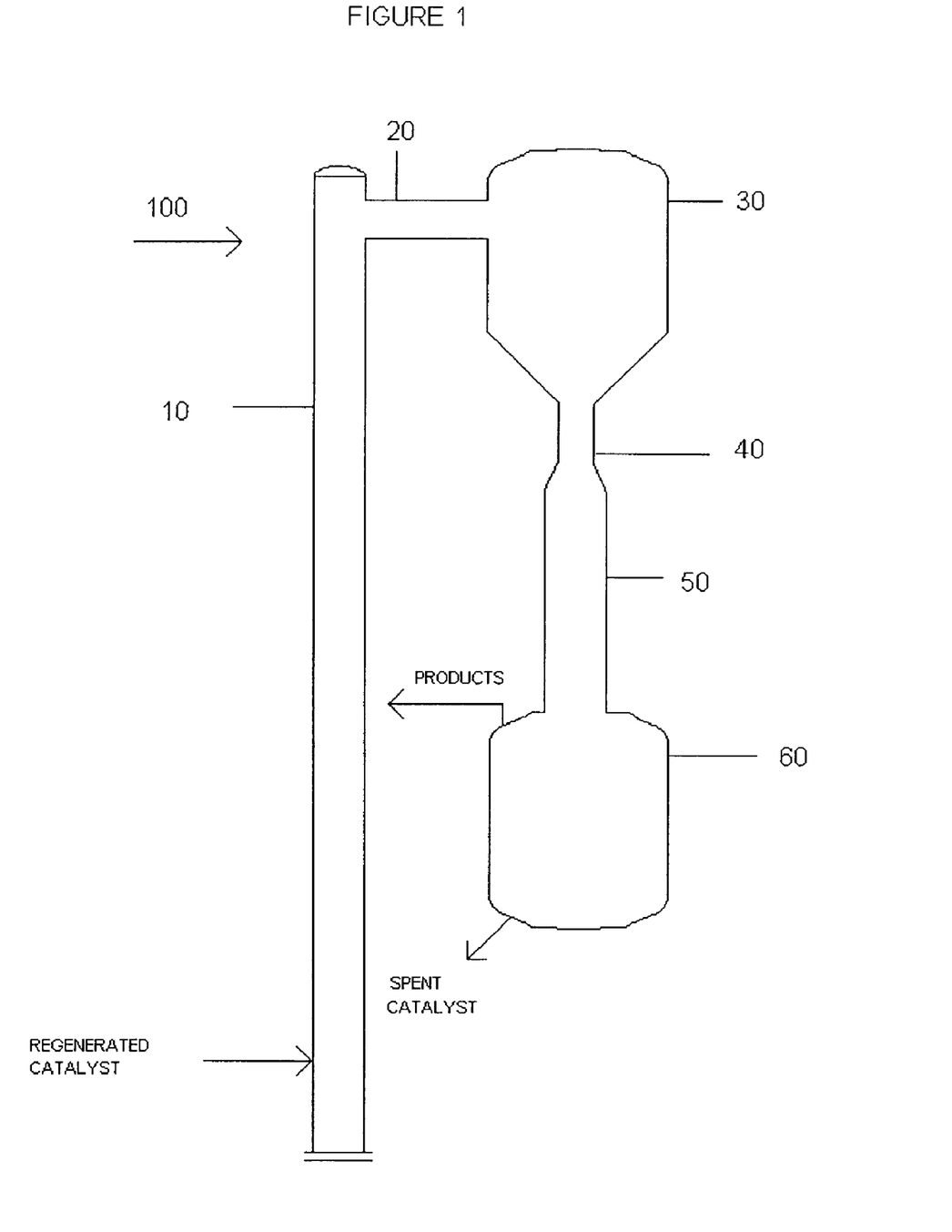
FIG. 1 attached is a schematic view of the apparatus of the invention.

FIG. 1 depicts the concept of the apparatus 100 of the invention.

So, regenerated catalyst riser 10 as used in the present application is a current riser in that it is a conduit for carrying a fluid.

It should be pointed out that riser 10 of the present apparatus is not used for effecting any cracking reaction. Instead, it is employed for carrying a diluted phase of regenerated catalyst, which has been regenerated in a regeneration section (not represented in the Figure).

According to the concept of the invention, the expression "diluted phase of regenerated catalyst" in regenerated catalyst riser 10 means a catalyst mass flux in said riser of from 50 to 500 $kg/(m^2.s)$, with an average range of from 150 to 300 $kg/(m^2.s)$.

The regeneration section useful for the purposes of the invention is any usual section belonging to any well-known catalyst regeneration technique.

Regenerated catalyst riser 10 allows that the present apparatus be installed on existing units at a cost below that entailed by modifications of the direction of flow.

Regenerated catalyst is directed from the regenerated catalyst standpipe (not represented) to the bottom of regenerated catalyst riser 10 where the catalyst is entrained by a carrying fluid.

A useful carrying fluid is steam.

Another option is to use water to replace steam. The water option may be the preferred one whenever it is intended to promote a major impact in the FCC thermal balance so that the regenerator operates under a lower temperature and catalyst circulation is increased. In this case water, receiving heat from the regenerated catalyst, is vaporized at the injection point.

A further possibility for a carrying fluid is a naphtha stream. Like the water option, the naphtha stream is vaporized while admitted to the riser, working therefore as a cooling medium.

Still, the process encompasses the use of fuel gas as catalyst carrying fluid, according to availability in the Gas Compressor (not represented).

A further alternative is the use of a natural gas stream depending on the availability of same in the refinery.

The combined use of those streams is possible as well, in any amount of each stream.

Even distribution of the carrying fluid is secured by using a fluidization ring situated at the bottom of regenerated catalyst riser 10 and radial nozzles (not represented) situated upwards (not represented).

A crossover section 20 connects the upper end of regenerated catalyst riser 10 to regenerated catalyst distributor 30.

Crossover section 20 is a section of a cylindrical or preferably rectangular shape sloped towards catalyst distributor 30 at an angle with the horizontal sufficient to avoid the undesirable phenomenon of saltation—separation of catalyst at the bottom of pipe—assuring transfer at a low pressure differential.

Also, such crossover 20 is connected to distributor 30 in such a position that the catalyst flow enters the said distributor in a tangential position.

So, through riser 10, regenerated catalyst as a diluted phase is directed via crossover section 20 to regenerated catalyst distributor 30.

Figure 2:
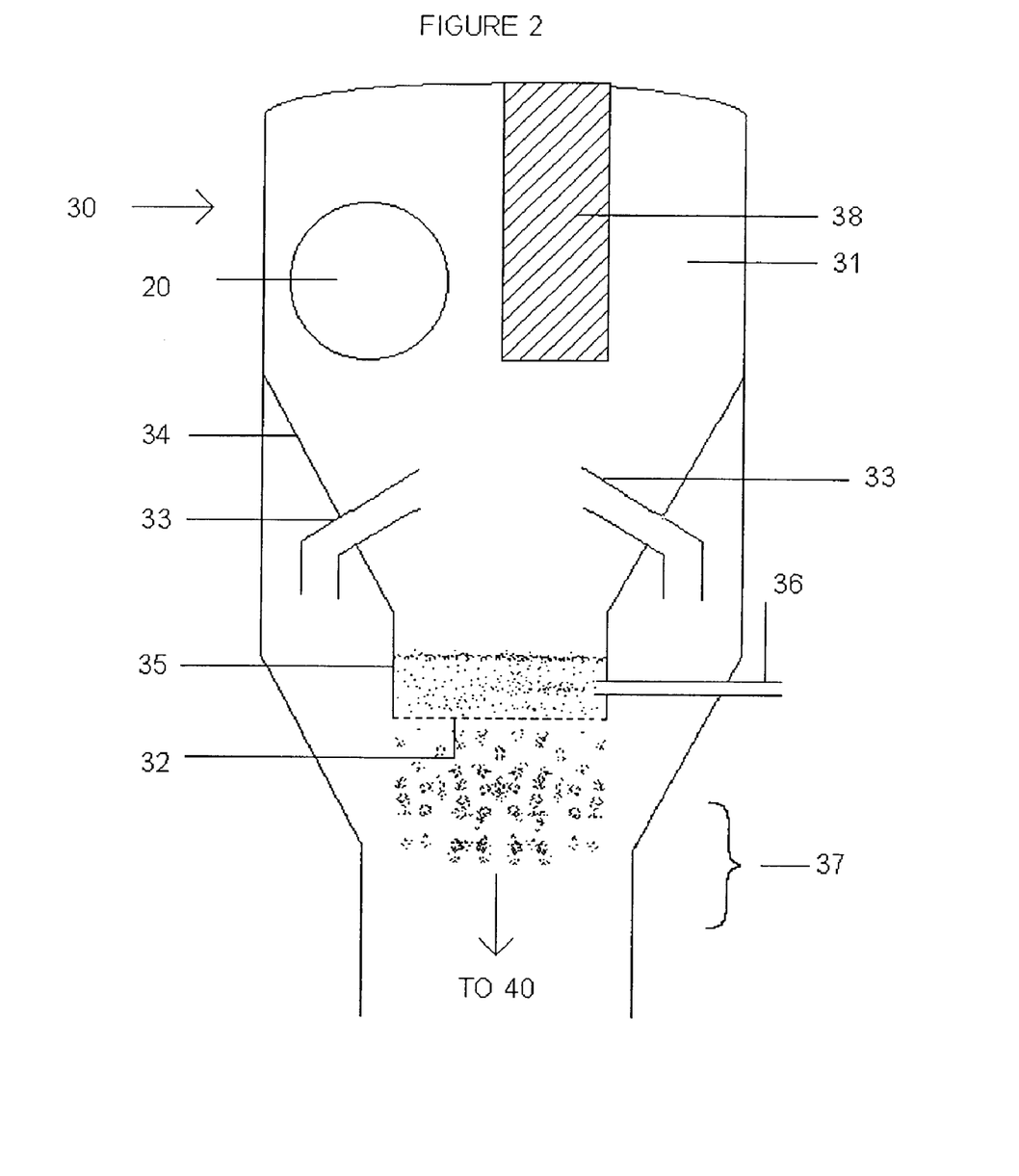
FIG. 2 attached is a schematic view of the regenerated catalyst distributor of the invention.

A detailed picture of regenerated catalyst distributor 30 is represented in FIG. 2.

Regenerated catalyst distributor 30 comprises:

A chamber 31 to which are directed regenerated catalyst and carrying fluid;

At least two pipes 33 for passage of regenerated catalyst carrying fluid;

A conical surface 34 which directs catalyst to be separated from carrying fluid towards a distributing basket 35, provided with a perforated plate 32;

A vertical, closed plug 38 attached to the top of distributor 30 to conform the flow into a curved way while restricting the area so that velocity of catalyst and carrying fluid may be increased, said plug 38 further directing the flow of catalyst and aiding in the separation of catalyst and carrying fluid by centrifuging;

Nozzles 36 to inject steam to aid in making uniform the catalyst level on basket 35 and fluidize the catalyst bed;

A catalyst acceleration zone 37 comprising a tapered portion and a cylindrical portion, allowing the catalyst to be directed towards mixing zone 40.

Alternatively, distributor 30 dispenses with closed plug 38.

The number of pipes 33 may vary of from two to several pipes, according to the unit size. So, two, four or more pipes 33 may be used.

The admixture of carrying fluid and catalyst from regenerated catalyst riser 10 is directed to regenerated catalyst distributor 30 where said admixture is centrifuged to separate carrying fluid and catalyst with the catalyst being then directed to mixing zone 40.

Catalyst distributor 30 is therefore designed to perform a double task: centrifuging the carrying fluid-catalyst admixture and evenly distribute the catalyst to be fed to mixing zone 40, making possible to achieve a perfect and instantaneous admixing of catalyst and feed, so as to secure a very quick reaction, of fractions of seconds, and at optimum selectivity conditions.

According to the invention, regenerated catalyst entry into regenerated catalyst distributor 30 is to be effected in the tangential mode.

Also, the velocity at which regenerated catalyst enters regenerated catalyst distributor 30 is an important process parameter. The minimum velocity is to be kept at 9.14 m/s (30 ft/s). The maximum velocity should not exceed 20 m/s (65 ft/s).

Catalyst distributor 30 receives, through crossover section 20 the admixture of regenerated catalyst and carrying fluid from regenerated catalyst riser 10, separating regenerated catalyst from carrying fluid by centrifuging.

Regenerated catalyst flows through conical surface 34 and feeds a distributing basket 35, the bottom of which is provided with a perforated plate 32, while carrying fluid flows through pipes 33 and is admixed at low velocity to regenerated catalyst under basket 35 in the tapered section of catalyst acceleration zone 37, without causing any disturbance to the homogeneous catalyst distribution provided for by the said basket 35. Said low velocity is of from 3 to 8 m/s (10 to 25 ft/s).

So, while the mixture of catalyst and carrying fluid has been separated by centrifugation and then the catalyst has been distributed through distributing basket 35 in an ideal way, the low momentum of the carrying fluid in the tapered section of catalyst acceleration zone 37 is not sufficient to disrupt the obtained catalyst distribution.

To avoid that pipes 33 on conical surface 34 might impair the flow of catalyst towards distributing basket 35 the shape of said pipes 33 is preferably that of a rectangular section linked to two semi circular sections constituted of half-pipes leading to an oblong shape, instead of a simple cylindrical section.

The cross section of pipes 33 may be so that gas velocity inside these pipes is no more than 20 m/s (65 ft/s) and that the free area for catalyst flowing at conical surface 34 is sufficient to assure a catalyst mass velocity preferably of no more than 500 kg/(m$^2$.s).

Whenever necessary, steam injection through nozzles 36 aids in making uniform the catalyst level on distributing basket 35 and in fluidizing the catalyst bed. A portion of injected steam (or other carrying fluid) flows through pipes 33 while another portion, admixed to catalyst, crosses distributing basket 35 and flows through catalyst acceleration zone 37.

There are several nozzles 36 around distributing basket 35, the number of nozzles being that required for the adequate fluidization of catalyst on distributing basket 35.

The catalyst/carrying fluid admixture, with the catalyst distributed in catalyst acceleration zone 37 of catalyst distributor 30, takes the shape of thin threads formed by perforations of perforated plate 32 of basket 35, and descends by gravity, through catalyst acceleration zone 37, towards mixing zone 40 (pick up section).

The diameter of perforations of perforated plate 32, the periphery of each perforation being hardened with a proper material, is such that an easiness of penetration of feed jet into catalyst threads is achieved in mixing zone 40 located below, assuring perfect contact among catalyst particles and feed.

A suitable range for the diameter of perforations of perforated plate 32 is of from 20–100 mm, more preferably between 40–80 mm. The total perforated area may be so that catalyst mass velocity (or mass flux) is in the range of from 250 to 750 kg/(m$^2$.s), preferably of from 400 to 600 kg/(m$^2$.s).

Figures 4, 4A:
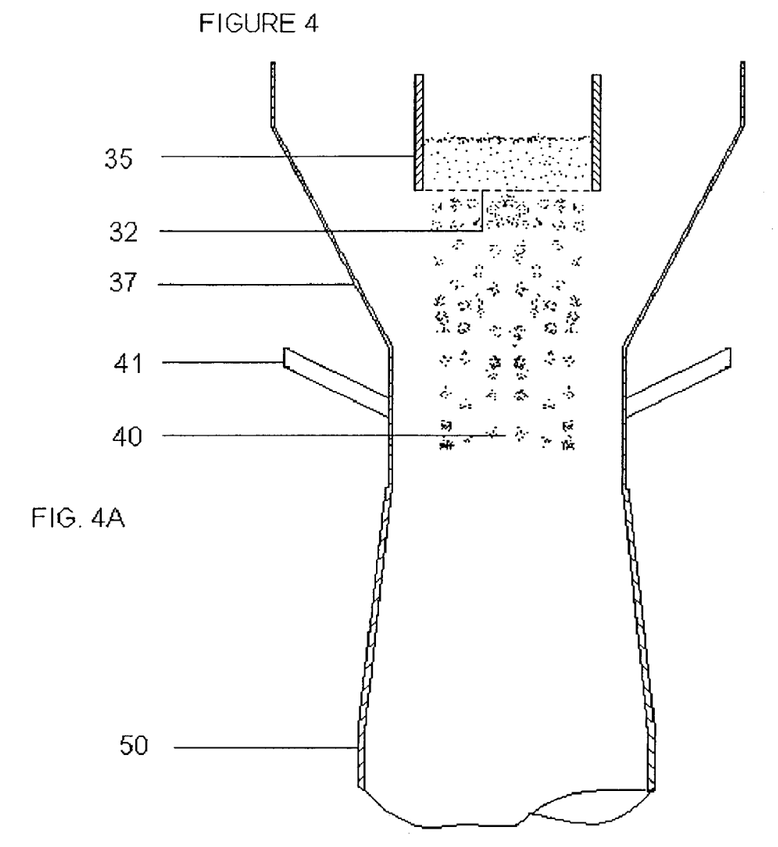
FIG. 4 illustrates the mixing zone with the feed injectors.
FIG. 4A is a schematic view of the mixing zone with the feed injectors.
Figure 4B:
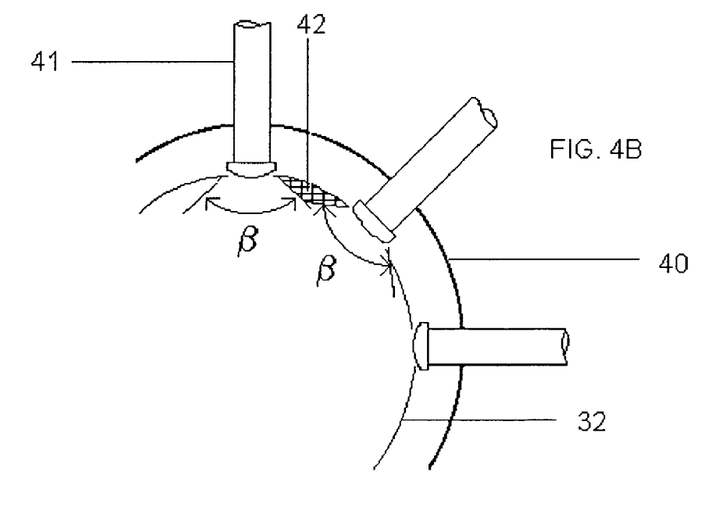
FIG. 4B is a top view including planes of perforated plate and tip of feed injectors.

The circumference of perforated plate 32 must be so that its projection fits with the circumference formed by the tips of feed injectors 41, located below at mixing zone 40, as illustrated in FIG. 4B.

Those criteria enable that full advantage of the downflow pattern is acquired, assuring prevailing of catalytic cracking over thermal cracking and full reaction completion.

In the improbable situation of plugging of perforated plate 32 of distributing basket 35, catalyst outflows through pipes 33, flowing together with carrying fluid by the area which is annular to said basket. This area and that of the gas pipes is sufficiently dimensioned so as to accommodate the overall catalyst circulation. In this case it might be necessary to inject fluidization steam through nozzles 36 connected to distributing basket 35, provisioned to attend this situation.

Regenerated catalyst having been distributed through regenerated catalyst distributor 30, the catalyst is directed to mixing zone 40, said mixing zone 40 being the site of feed injection of downflow reactor 50 of FIG. 1, the reactor being provided with feed injectors 41, said feed injectors being a device for atomizing the feed into a mist of hydrocarbon droplets in such a way as to minimize feed vaporization time and optimize catalyst-to-oil contact.

Catalyst begins to accelerate under the action of gravity in catalyst acceleration zone 37, designed so that the length of same is sufficient for the catalyst to attain a final velocity adequate to introduce the catalyst into the jet of feed admixed by feed injectors 41, located at mixing zone 40. Said velocity may be of from 1.5 to 11 m/s (5–35 ft/s) more preferably of from 5 to 8 m/s (15–25 ft/s).

The diameter of the cylindrical portion of acceleration zone 37 is adjusted to satisfy two conditions: the velocity of the carrying fluid that descends with the catalyst is similar to the catalyst velocity and the cross section of said cylindrical portion is adjusted to be the same as that of distributing catalyst basket 35.

The described assortment of criteria assures an optimum kinetic energy balance and confinement at mixing zone 40, which, combined with the feed injectors 41 described below assure an unique and optimum downflow reaction process so as to prevail the desired catalytic reactions until their completion.

Figure 3A:
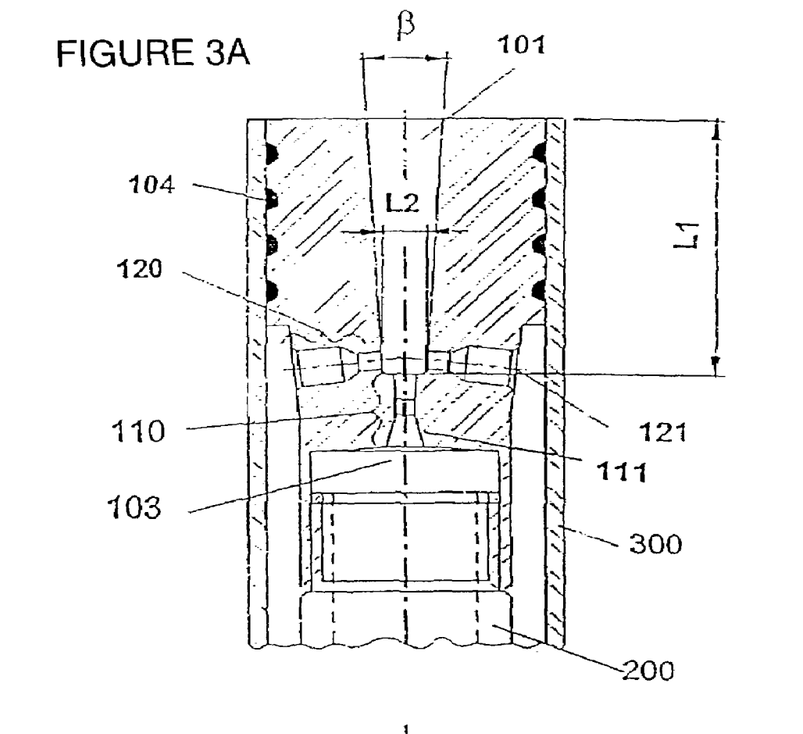
FIG. 3 is a view of the feed injectors of WO 01/44406 used to vaporize the feed.
Figure 3B:
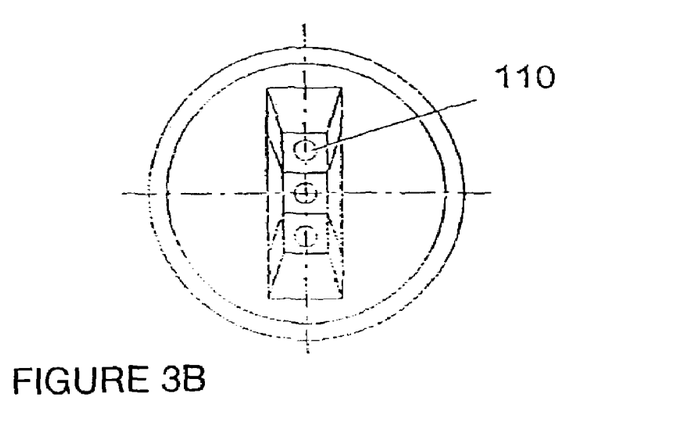

Feed injectors 41 are illustrated in FIG. 3.

Feed injectors 41 are basically made up of an atomization chamber provided with central nozzles 110 for atomization fluid and side nozzles 120 for liquid feed. A concentric conduit system conveys atomization fluid and the liquid feed to the atomization unit where the flows of atomization fluid and liquid feed will encounter each other. The relative arrangement of the said central and side nozzles will cause the complete atomization of the feed while promoting the optimized interaction with the descending catalyst. The contact with the finely atomized feed and the hot regenerated catalyst promotes the vaporization of the liquid feed, this contributing to the improved performance of the FCC unit.

According to the diameter of the downflow reaction zone, a variable number of feed injectors are installed. The number of said injectors is a function of the cross sectional area of the reaction zone, the number of injectors being chosen so as to cover the highest possible cross sectional area. Feed injectors can be accommodated in one single stage or in more than one stage, according to different level elevations in the downflow reactor. Thus, 2, 4, 6 or more of said injectors may be used.

According to the invention, feed injectors may be installed at angles between −30° and +30° relative to the horizontal. Preferably, injectors are mounted at an inclination of 0° to +30°, or with a slight negative angle, with the atomized feed being injected in a direction opposite to the catalyst flow.

The admixture of the liquid feed and the atomization fluid occurs in an atomization chamber, the geometry of which plays a major role in the complete atomization of the feed.

It should be understood that in spite of the fact that a specific kind of feed injector has been described as particularly useful for the purposes of the invention, other highly efficient feed injectors can be used as well in the present apparatus and process.

FIG. 4A illustrates the bottom part of distributor 30 with distributing basket 35, perforations 32 and catalyst acceleration zone 37 connected to mixing zone 40 containing feed injectors 41, followed by reactor 50.

FIG. 4B is a top view including planes of perforated plate and tip of feed injectors where the dotted line is a projection of the inner surface representing the area covered by the catalyst threads through perforated plate 32 of distributing basket 35.

In FIG. 4B, opening angle β defines the area to be covered by the feed jet. Hatched surface 42 represents the only area not covered by the feed jet. In this area catalyst only may be found. The surface area of perforated plate 32 as well as the cross sectional areas of mixing zone 40 are defined so as to minimize hatched surface 42.

Also, the depth at which feed injectors 41 are inserted in mixing zone 40 is an important parameter. Thus, if tip of feed injectors 41 are too close to the wall of mixing zone 40, an area will be created where there is feed only, and no catalyst. On the other hand, if tips of feed injectors 41 are too far from the wall of mixing zone 40, hatched area 42 will increase beyond desirable boundaries.

Regenerated catalyst from catalyst distributor 30 contacts feed in the mixing zone 40 of downflow reactor 50, providing the required heat to vaporize the feed, bringing the feed to the reaction temperature and providing for the endothermal heat of the desirable cracking reactions.

The diameter of said mixing zone 40 is such as to assure a gas velocity in the range of from 2 to 15 m/s, preferably of from 5 to 10 m/s.

Downflow reactor 50 is a pipe where the cracking reaction is carried out. Reactor 50 has a substantially vertical axis provided with feed injectors 41 in the upper part of same for introducing feed. The bottom of downflow reactor 50 is connected to diplegless cyclones 61 inside collector vessel 60 by means of pipe 67 for discharge of the obtained cracked hydrocarbons and spent catalyst.

The exit temperature of downflow reactor 50 is controlled by altering the catalyst circulation by acting on the opening of the regenerated catalyst slide valve. In order to attain the desired conversion levels established in the Engineering project, such temperature should be kept between 450° C. and 700° C. A preferred temperature is of from 520° C. to 570° C.

Downflow reactor 50 preferably operates at a pressure of from 1.0 to 2.0 bar.

The carrying fluid used in regenerated catalyst riser 10 will aid in reducing the partial hydrocarbon pressure in reactor 50 as well as the catalyst temperature, this in turn contributing to reducing thermal cracking undesirable side reactions.

The admixture of catalyst, cracked hydrocarbons, steam and inert gases entrained from regenerator (not represented) crosses the overall downflow reactor 50.

The catalyst-to-oil contact time preferably is 0.5 to 5 seconds, more preferably 1 to 4 seconds, and even more preferably 1.5 to 3 seconds.

The catalyst mass velocity (or mass flux) in downflow reactor 50 is of from 50 to 500 kg/(s.m$^2$), more preferably of from 100 to 350 kg/(s.m$^2$), and even more preferably of from 150 to 250 kg/(s.m$^2$).

Following cracking reaction in downflow reactor 50, cracked hydrocarbons and spent catalyst are produced, which should be separated in diplegless cyclones 61 of the quick separation device inside collector vessel 60, that is, a system according to U.S. Pat. No. 5,569,435 adapted for downflow reactors.

In FIG. 1 collector vessel, which contains diplegless cyclones 61 is indicated by numeral 60.

Figure 5:
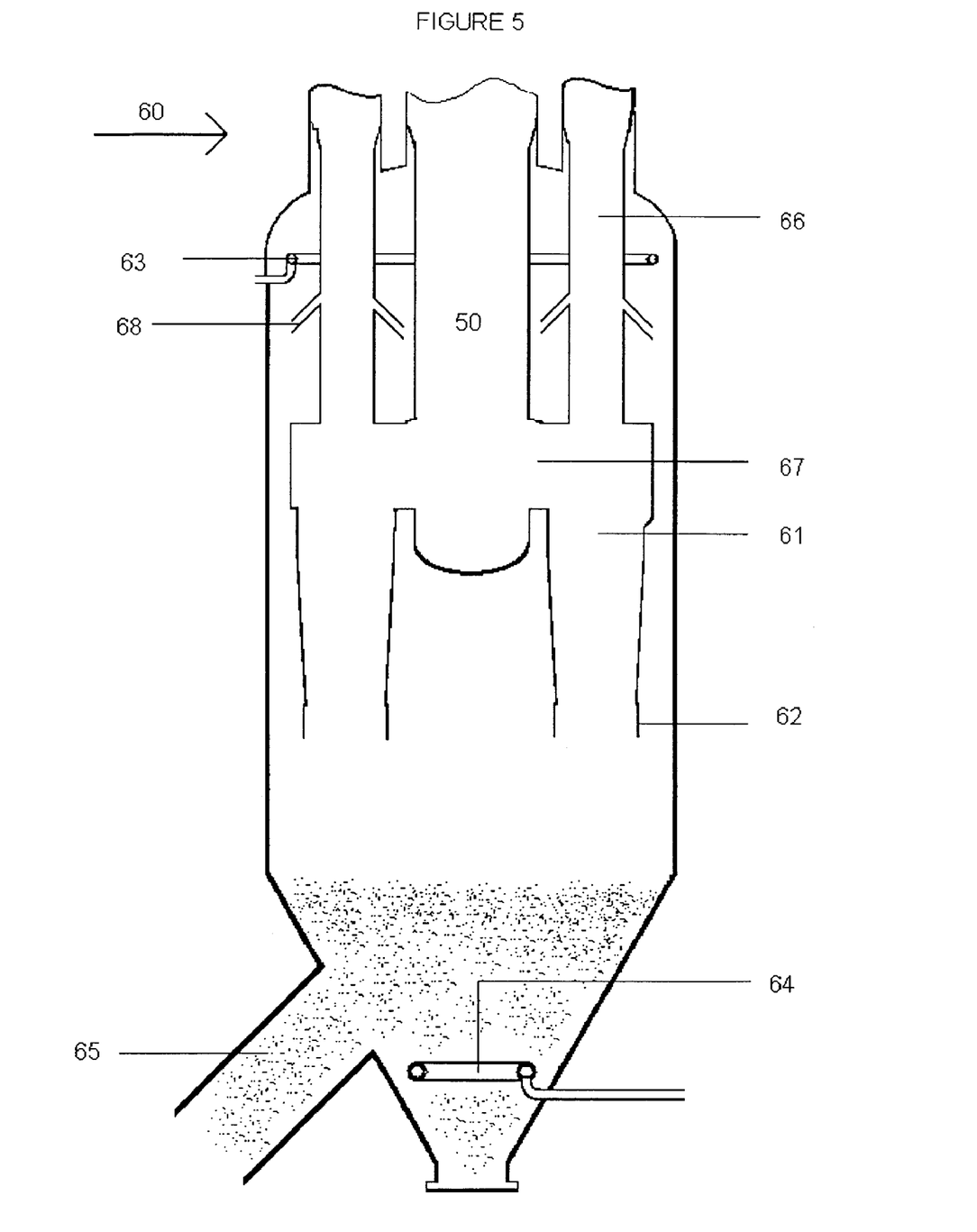
FIG. 5 attached is the quick separation device inside the collector vessel of the invention, as adapted from U.S. Pat. No. 5,569,435.

Collector vessel 60 and its internals are represented in FIG. 5.

The design of diplegless cyclones 61 allows the quick separation of catalyst from cracked hydrocarbons so as to avoid product overcracking after the reaction zone, while minimizing the amount of hydrocarbons entrained to the stripping zone.

The rich suspension of spent catalyst particles and lighter cracked hydrocarbons adsorbed onto the catalyst is discharged from the bottom of said downflow reactor 50 and is directed to rectangular cross section pipe 67 connected to downflow reactor 50 bringing about the swift separation of the gas phase from particulate phases inside diplegless cyclones 61.

The stream of cracked hydrocarbons, substantially free from catalyst particles, leaves diplegless cyclones 61 to outlet pipe 66, which receives said stream directly from diplegless cyclones 61 and also from conduits 68, placed in the upper part of diplegless cyclones 61 and then to the fractioning system (not represented).

All of the catalyst separated out by diplegless cyclones 61 is gathered in the bottom of collector vessel 60, while fluid injecting device 64 keeps an even distribution of catalyst in the bottom of said vessel 60.

Purging of stagnated parts of collector vessel 60 is done by purging fluid from a steam supply through injecting devices 63.

Alternatively, device 64 may effect a first removal of entrained hydrocarbons (stripping) from the spent catalyst.

Spent catalyst conduit 65 carries spent catalyst to an additional stripping zone or to a regenerator (not represented).

An alternative to reduce the invention to practice is, whenever it is wished, to bleed a suspension of particles and reacted mixture through lower mouth 62 of diplegless cyclones 61. This improves gathering efficiency of solids within collector vessel 60. In blocking the gas stream from vessel 60 to within cyclones 61 a reentrainment of catalyst particles is prevented, this being the great problem in dealing with unconfined cyclones.

Hydrocarbons bled off, representing of from 3 to 20% outflow to the fractioning system, originate from collector vessel 60 together with the stripping fluid and the purging fluid out of the upper part of diplegless cyclones 61 or through conduits 68.

In said diplegless cyclones 61, more than 99% of the catalyst is separated from hydrocarbon gases, the separated catalyst leaving cyclones 61 through mouth 62 and being deposited in the bottom of vessel 60. The gases leave quick separation vessel 60 through outlet pipes 66, which are fed by the separated gases that leave cyclones 61 and by the gases, which are being carried through conduits 68.

The apparatus 100 of the invention may be used with other, state-of-the-art quick separation systems, the invention therefore not being limited to the quick separation system inside collector vessel 60 shown in FIG. 5.

The quick separation performed in collector vessel 60 avoids hydrocarbon overcracking. Once the hydrocarbon gas phase and catalyst phase are separated, the gas phase is directed to the product fractioning system (not represented) and the spent catalyst is directed to a stripping vessel (not represented).

Coke-recovered spent catalyst deposited in the bottom of quick separation vessel 60, the coke being a result of the catalytic reactions, is directed to a stripper (not represented)

that contacts the catalyst particles with a stripping gas for displacement of remaining hydrocarbon gases in the void volume of the catalyst.

Catalyst activity is restored by coke combustion in a regenerator. Catalyst regeneration occurs at a low steam partial pressure, due to the low hydrogen content in coke resulting from the quick separation device. The regenerator bed operates at temperatures of from 600 to 750° C., preferably of from 670° C. to 720° C. and at a pressure of from 1.0 to 2.5 bar. Catalyst fines recovered by regenerator first stage cyclones and regenerator second stage cyclones return to the catalyst bed.

Combustion gases generated by coke combustion ascend throughout the fluidized bed of the regenerator, being directed to the dilute phase and to the internal or external chamber of regenerator, and from there, to the combustion gases slide valve that controls the system pressure.

Therefore, the considerations set forth above in the present specification confirm that the invention provides a low-cost installation of a downflow reactor system in existing FCC units, such approach being unknown in the state-of-the-art technique.

The FCC process to be carried out in the said apparatus is mainly directed to heavy feeds. The density $d_{20/4}$ of an exemplary heavy vacuum gasoil is 0.9386, with a Ramsbottom Carbon Residue RCR of 0.38 wt %. Final boiling point is higher than 500° C.

The process will then operate at catalyst-to-oil ratios of from 3 to 15, more preferably of from 6 to 10 and still more preferably, of from 7.0 to 9.0.

The operation temperature of the feed varies of from 200° C. to 400° C. A preferred operation range is of from 310 to 350° C. Thus, feed at 320° C. is introduced in downflow reactor 50 through a set of feed injectors 41 according to WO 01/44406. The so-dispersed feed is atomized by dispersion steam into droplets the size of which is lower than 200 μm, in a mixing chamber 101 situated at the lower end of dispersion nozzles 120, from which feed is injected in downflow reactor 50 as a fine spray. It should be pointed out that the feed atomization efficiency is of paramount importance in downflow reactor systems since, contrary to upflow systems or risers, there is no catalyst recirculation inside a downflow reactor.

The temperature to introduce regenerated catalyst into the regenerated catalyst standpipe (not represented) is of from 600° C. to 750° C., more preferably of from 670° C. to 720° C. Thus catalyst is introduced in the regenerated catalyst standpipe, the flow of same being controlled through a slide valve (not represented). Slide valve is actuated under the reaction temperature control, said temperature being determined at a chosen site at the lower end of the downflow reactor 50.

It should be pointed out that present FCC technology makes use mainly of riser reactors. So, any improvement in FCC technology employing downflow reactors should be compared to standard riser technology. That is why the present invention uses as a comparative Example standard results from a riser cracking reaction. Another point is that there are no known downflow reactor operating industrial units.

Therefore, the advantages of the present invention will now be illustrated by comparing yields with those from a typical FCC riser according to the following Example, which should not be construed as limiting it.

EXAMPLE

The feed is made up of 80% heavy gasoil and 20% vacuum residue. The feed main features are listed in Table 1 below.

TABLE 1

| | |
|---|---|
| $D_{20/4}$ | 0.9386 |
| R.C.R (wt %) | 0.38 |
| SULFUR (% wt) | 0.575 |
| ASPHALTENES (% wt) | 0.1 |
| TOTAL NITROGEN (ppm) | 3,211 |
| BASIC NITROGEN (ppm) | 961 |
| ANILINE POINT (° C.) | 80.8 |
| VISCOSITY AT 40° C. (cSt) | 268.4 |
| VISCOSITY AT 100° C. (cSt) | 14.57 |
| ASTM D 1160 DISTILLATION @ 760 mmHg, ° C. | |
| IBP | 334.5 |
| 5% | 387.1 |
| 10% | 398.3 |
| 20% | 423.2 |
| 30% | 440.6 |
| 40% | 455.6 |
| 50% | 471.3 |
| 60% | 490.4 |
| 70% | 512.4 |
| METALS (ppm) | |
| Ni | <1 |
| V | <1 |

The cracking reaction was carried out in an apparatus according to the invention, under overall reaction conditions as stated above.

Yields of both the Riser Technology column and the invention column are obtained from pilot units, the comparison being established under iso-coke conditions.

Reaction yields are as listed in Table 2 below.

TABLE 2

| YIELDS BASED ON FEED | RISER TECHNOLOGY Weight % | INVENTION Weight% |
|---|---|---|
| Fuel gas | 3.6 | 3.5 |
| LPG (incl. propylene) | 20.3 | 21.0 |
| Gasoline, $C_5$-220° C. | 47.5 | 52.6 |
| LCO | 12.1 | 9.6 |
| Decanted Oil | 8.0 | 4.8 |
| Coke | 8.5 | 8.5 |
| Total | 100.0 | 100.0 |
| Propylene | 7.0 | 9.0 |
| Conversion | 79.9 | 85.6 |

Therefore, the present invention leads to high yields in valuable products such as propylene, LPG and gasoline while keeping coke yields within reasonable values.

As compared to typical results obtained from state-of-the-art riser technology, the FCC process as carried out in the inventive apparatus yields neatly superior results.

We claim:

1. An apparatus for fluid catalytic cracking of a hydrocarbon feed oil containing liquid hydrocarbons boiling between 340° C. to 720° C., wherein said apparatus comprises:

e) a regenerated catalyst riser carrying a diluted phase regenerated catalyst up to a regenerated catalyst distributor;

f) a regenerated catalyst distributor provided with a distributing basket and an independent passage through pipes for the carrying fluid used to carry catalyst in said regenerated catalyst riser, said catalyst distributor being connected to said riser by a crossover section and to a downflow reactor by means of a catalyst acceleration zone followed by a mixing zone, said distributor centrifuging carrying fluid and catalyst and distributing catalyst to said downflow reactor;

g) a downflow reactor, having in the upper part of same a mixing zone to start the catalytic cracking reaction, wherein said mixing zone is provided with feed injectors to vaporize the feed which will contact the regenerated catalyst in said mixing zone, the bottom part of said reactor being connected to diplegless cyclones by means of a rectangular cross-section pipe; and h) a collector vessel provided with a quick separation device to swiftly separate spent catalyst from reacted hydrocarbon gases.

2. An apparatus according to claim 1, wherein said crossover section is sloped towards said catalyst distributor at an angle with the horizontal.

3. An apparatus according to claim 1, wherein the catalyst flow enters the distributor in a tangential position.

4. An apparatus according to claim 1, wherein said feed injectors installed in said mixing zone of the downflow reactor comprise an atomization unit provided with central nozzles for atomization fluid and side nozzles for liquid feed; said nozzles being arranged so as to cause the complete atomization of the feed while promoting the optimized interaction with the hot descending catalyst.

5. An apparatus according to claim 1, wherein the number of said feed injectors is a function of the cross sectional area of said mixing zone, the number of feed injectors being chosen so as to cover the highest possible cross sectional area, said feed injectors being accommodated in one single stage or in more than one stage.

6. An apparatus according to claim 4, wherein said feed injectors may be installed at angles between −30° and +30° relative to the horizontal, with the atomized feed being injected in a direction opposite to the catalyst flow.

7. An apparatus according to claim 4, wherein said feed injectors are mounted at an inclination of 0° to +30°, with the atomized feed being injected in a direction opposite to the catalyst flow.

8. An apparatus according to claim 1, wherein the feed injector is any highly efficient feed injector.

9. An apparatus according to claim 1, wherein the surface area of the perforated plate that distributes the catalyst associated to the opening angle β of the feed jet minimizes the area where catalyst only is found.

10. An apparatus according to claim 1, wherein the carrying fluid is admixed at a low velocity of from 3 to 8 m/s (10 to 25 ft/s) to regenerated catalyst under distributing basket in the tapered section of said catalyst acceleration zone.

11. An apparatus according to claim 1, wherein the diameter of said mixing zone is such as to assure a carrying fluid velocity of from 2 to 15 m/s.

12. An apparatus according to claim 1, wherein the diameter of said mixing zone is such as to assure a carrying fluid velocity of from 5 to 10 m/s.

13. An apparatus according to claim 1, wherein the collector vessel comprises a rectangular cross section pipe directly connected to said downflow reactor and to diplegless cyclones symmetrically positioned at the exit of said downflow reactor to separate more than 99% of the catalyst from the hydrocarbon gases in said diplegless cyclones.

14. A regenerated catalyst distributor for a downflow reactor included in an apparatus for the fluid catalytic cracking of heavy hydrocarbons, wherein said catalyst distributor comprises:

a) a chamber to which are directed regenerated catalyst and carrying fluid from a regenerated catalyst riser;

b) at least two pipes for passage of regenerated catalyst carrying fluid;

c) a conical surface to direct catalyst to be separated from carrying fluid towards a distributing basket provided with a perforated plate;

d) a vertical, closed plug attached to the top of said distributor to conform the flow into a curved way;

e) nozzles to inject steam to aid in making uniform the catalyst level on said distributing basket and fluidize the catalyst bed;

f) a catalyst acceleration zone comprising a tapered portion and a cylindrical portion, allowing the catalyst to be directed towards a mixing zone of a downflow reactor where catalyst and feed are to be admixed, with said distributor performing the centrifugation of catalyst carrying fluid and catalyst, directing catalyst to said mixing zone while the catalyst carrying fluid flows through said pipes and is admixed at low velocity to catalyst under said distributing basket.

15. A regenerated catalyst distributor according to claim 14, wherein alternatively, said distributor dispenses with said vertical, closed plug.

16. A regenerated catalyst distributor according to claim 14, wherein the shape of said pipes is oblong.

17. A regenerated catalyst distributor according to claim 14, wherein the maximum gas velocity inside said pipes is 20 m/s (65 ft/s) while catalyst maximum mass velocity is 500 kg/(m$^2$.s).

18. A regenerated catalyst distributor according to claim 14, wherein the perforations diameter of said perforated plate is from 20 to 100 mm.

19. A regenerated catalyst distributor according to claim 14, wherein the perforations diameter of said perforated plate is from 40 to 80 mm.

20. A regenerated catalyst distributor according to claim 14, wherein catalyst mass velocity through the perforated area is from 250 to 750 kg/(m$^2$.s).

21. A regenerated catalyst distributor according to claim 20, wherein catalyst mass velocity through the perforated area is from 400 to 600 kg/(m$^2$.s).

22. A regenerated catalyst distributor according to claim 14, wherein the circumference of said perforated plate is such that the projection of same matches the circumference formed by the tips of the feed injectors located at the mixing zone below.

23. A regenerated catalyst distributor according to claim 14, wherein the carrying fluid is admixed at a low velocity of from 3 to 8 m/s (10 to 25 ft/s) to regenerated catalyst under distributing basket in the tapered section of said catalyst acceleration zone.

24. A regenerated catalyst distributor according to claim 14, wherein said catalyst acceleration zone is designed so that the length of said zone is sufficient for the catalyst to attain a final velocity to introduce the catalyst into the jet of feed admixed by the feed injectors located at the mixing zone below.

25. A regenerated catalyst distributor according to claim 24, wherein said final velocity is from 1.5 to 11 m/s (5 to 35 ft/s).

26. A regenerated catalyst distributor according to claim 25, wherein said final velocity is from 5 to 8 m/s (15 to 25 ft/s).

27. A regenerated catalyst distributor according to claim 24, wherein the diameter of said cylindrical portion of the acceleration zone is adjusted so that the velocity of the carrying fluid that descends with the catalyst is similar to the catalyst velocity.

28. A regenerated catalyst distributor according to claim 24, wherein the diameter of said cylindrical portion of the acceleration zone is adjusted so that the cross section of said cylindrical portion is adjusted to be the same as that of the distributing basket.

29. A process for the fluid catalytic cracking of a hydrocarbon feed oil containing liquid hydrocarbons boiling between 340° C. and 720° C., in the absence of any added hydrogen, wherein said process comprises the following steps:
  a) providing a regenerated catalyst riser, a regenerated catalyst distributor linked to said riser by means of a crossover section, a downflow reactor including a mixing zone, feed injectors and a collector vessel provided with a quick separation device;
  b) introducing regenerated catalyst at 600° C. to 750° C. to the bottom of said regenerated catalyst riser where the catalyst is entrained by a carrying fluid as a diluted phase up to said cross-over section connected to said distributor, the diluted phase of catalyst and carrying fluid entering the said distributor in tangential mode;
  c) centrifuging, in said catalyst distributor, to separate carrying fluid and catalyst, and evenly distributing the catalyst to be fed to a mixing zone of said downflow reactor, the catalyst flowing downward through a conical surface of said distributor and to a catalyst distributing basket, the bottom of which is provided with perforations, while carrying fluid flows through gas pipes to be admixed at low velocity to the catalyst under said distributing basket, said catalyst being accelerated in an acceleration zone under the influence of gravity;
  d) injecting hydrocarbon feed at 200° C.–400° C. into said mixing zone of said downflow reactor by means of feed injectors so as to completely atomize the hydrocarbon feed, the so-atomized feed as a fine spray reacting then with catalyst descending in threads from said distributing basket, the reaction yielding a rich suspension of spent catalyst particles and lighter hydrocarbon cracked products adsorbed onto the catalyst, said suspension being discharged from the bottom of said downflow reactor towards the quick separation device of said collector vessel; and
  e) swiftly separating, in said quick separation device, cracked hydrocarbon products from catalyst particulate phases.

30. A process according to claim 29, wherein the regenerated catalyst carrying fluid is steam, water, naphtha, natural gas or fuel gas.

31. A process according to claim 29, wherein the carrying fluid used to carry catalyst in the regenerated catalyst riser aids in reducing the partial hydrocarbon pressure in the downflow reactor as well as the catalyst temperature, thus reducing thermal cracking side reactions.

32. A process according to claim 29, wherein the diluted phase of catalyst mass flux in the regenerated catalyst riser is from 50 to 500 kg/(m².s).

33. A process according to claim 32, wherein the diluted phase of catalyst mass flux in the regenerated catalyst riser is from 150 to 300 kg/(m².s).

34. A process according to claim 29, wherein the minimum velocity at which regenerated catalyst enters said regenerated catalyst distributor is 9.14 m/sec (30 ft/sec).

35. A process according to claim 29, wherein the maximum velocity at which regenerated catalyst enters said regenerated catalyst distributor does not exceed 20 m/sec (65 ft/sec).

36. A process according to claim 29, wherein the final catalyst velocity in the acceleration zone is from 1.5 to 11 m/s (5–35 ft/s).

37. A process according to claim 36, wherein the final catalyst velocity in the acceleration zone is from 5 to 8 m/s (15–25 ft/s).

38. A process according to claim 29, wherein the carrying fluid velocity in said mixing zone is from 2 to 15 m/s.

39. A process according to claim 38, wherein the carrying fluid velocity in said mixing zone is from 5 to 10 m/s.

40. A process according to claim 29, wherein the catalyst mass velocity in said downflow reactor is from 50 to 500 kg/(s.m²).

41. A process according to claim 40, wherein the catalyst mass velocity in said downflow reactor is from 100 to 350 kg/(s.m²).

42. A process according to claim 41, wherein the catalyst mass velocity in said downflow reactor is from 150 to 250 kg/(s.m²).

43. A process according to claim 29, wherein the downflow reactor operates at a pressure from 1.0 to 2.0 bar.

44. A process according to claim 29, wherein the cracking reaction occurs in 1 to 4 seconds.

45. A process according to claim 44, wherein the cracking reaction occurs in 1.5 to 3 seconds.

46. A process according to claim 29, wherein the catalyst-to-oil ratio is from 3 to 15.

47. A process according to claim 46, wherein the catalyst-to-oil ratio is from 6 to 10.

48. A process according to claim 47, wherein the catalyst-to-oil ratio is from 7 to 9.

49. A process according to claim 29, wherein the exit temperature of said downflow reactor is from 450° C. to 700° C.

50. A process according to claim 49, wherein the exit temperature of said downflow reactor is from 520° C. to 570° C.

51. A process according to claim 29, wherein more than 99% of the catalyst is separated from the hydrocarbon gases in said diplegless cyclones inside the collector vessel, the separated catalyst leaving cyclones through a mouth and being deposited in the bottom of said collector vessel while hydrocarbon gases leave said diplegless cyclones through outlet pipes, said outlet pipes being fed by the separated gases that leave said cyclones and by the gases, which are being carried through conduits inserted in said outlet pipes.

52. A process according to claim 51, wherein to achieve a higher efficiency in the gathering of solids within said collector vessel, a suspension of particles and reacted mixture is bled off through a lower mouth of said diplegless cyclones.

53. A process according to claim 29, wherein the quick separation device for separating spent catalyst from reacted hydrocarbon gases is a quick separation device.

54. An apparatus according to claim 4, wherein the number of said feed injector a function of the cross sectional area of said mixing zone, the number of feed injectors being chosen so as to cover the highest possible cross sectional area, said feed injectors being accommodated in one single stage or in more than one stage.

55. A process according to claim 30, wherein the carrying fluid used to carry catalyst in the regenerated catalyst riser aids in reducing the partial hydrocarbon pressure in the downflow reactor as well as the catalyst temperature, thus reducing thermal cracking side reactions.

* * * * *